United States Patent [19]

Hoshino

[11] Patent Number: 4,989,290
[45] Date of Patent: Feb. 5, 1991

[54] WIPER ARM EQUIPMENT
[75] Inventor: Takashi Hoshino, Isesaki, Japan
[73] Assignee: Mitsuba Electric Manufacturing Co., Ltd., Gunma, Japan
[21] Appl. No.: 390,659
[22] Filed: Aug. 7, 1989
[30] Foreign Application Priority Data
  Aug. 9, 1988 [JP]  Japan ............................. 63-105162[U]
[51] Int. Cl.⁵ ................................................ A47L 1/02
[52] U.S. Cl. ................................. 15/250.42; 15/250.20
[58] Field of Search ............ 15/250.42, 250.20, 250.21
[56] References Cited
  U.S. PATENT DOCUMENTS
  4,570,284  2/1986  Vernon ............................. 15/250.42
  FOREIGN PATENT DOCUMENTS
  1949948  4/1971  Fed. Rep. of Germany ... 15/250.20
  1328616  4/1963  France .............................. 15/250.42
  1370826  7/1964  France .............................. 15/250.20
  543635   3/1942  United Kingdom ............. 15/250.20
  964139   7/1964  United Kingdom ............. 15/250.42

Primary Examiner—Frankie L. Stinson
Attorney, Agent, or Firm—Rodman & Rodman

[57] ABSTRACT

Wiper arm equipment to be mounted on a glass surface of a wind shield of a vehicle. A wing of the wiper arm equipment is commonly used in the case of an installation on a production line of the wiper arm equipment and in the case of an optional installation. A pair of insert plates is planted in the wing as an integral part, and a pair of screw holes is bored on each insert plate with predetermined distance. One of the screw holes is arranged in a position facing the arm piece when the wing is to be mounted on the arm piece, and the other screw hole is arranged in a position other than that facing the arm piece. In the case of the optional installation, each pair of stays is fastened with a screw through the other screw hole so as to cover each insert plate.

8 Claims, 3 Drawing Sheets

FIG. 2
FIG. 3
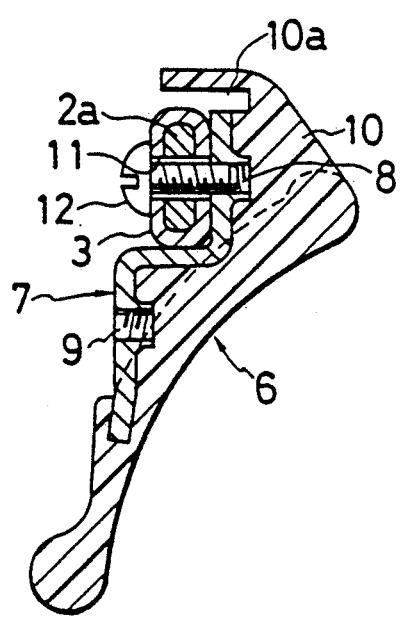
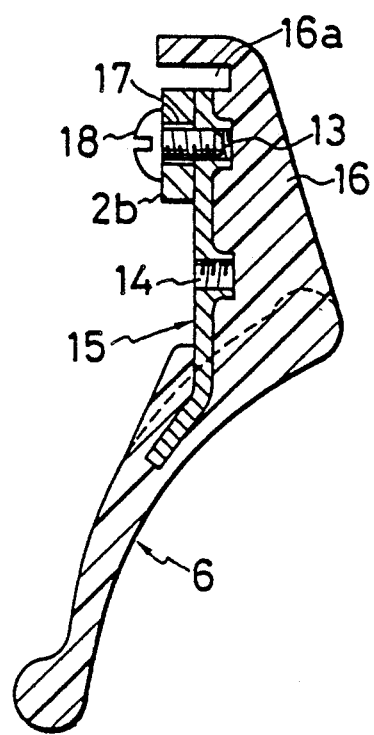

FIG. 4
FIG. 5
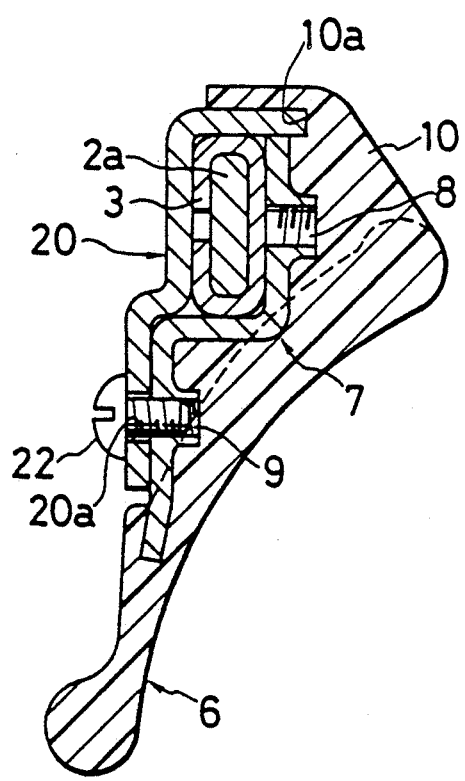
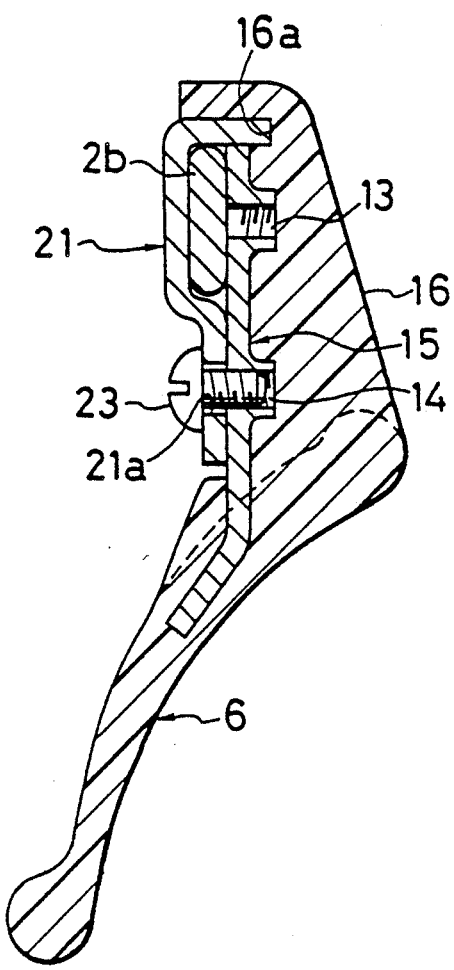

WIPER ARM EQUIPMENT

BACKGROUND OF THE INVENTION

1. Field of the Invention

The present invention relates to a wiper arm equipment, especially to a wiper arm equipment which is mounted on a glass surface of the front wind shield of a vehicle and effective in that common wing can be used in installation on the production line of wiper arm equipment and in optional installation by a user.

2. Related Art Statement

In a wiper arm equipment mounted on the front wind shield of a vehicle, one end of the wiper arm is rotatably arranged on the lower side of the inclined wind shield, and a wiper blade is mounted on the other end of the arm. In the wiper arm equipment of this type, the wiper blade will easily put off from the surface of the front wind shield under high-speed traveling of the vehicle, thus, reducing wiping effect of the blade on the shield surface.

Thus, wiper arm equipment is known which constituted in such a way that the wing is fixed on the arm piece of the wiper arm adjacent to the wiper blade to press the wiper blade onto the front wind shield by the air resistance produced by the wing when the vehicle moves at a high-speed.

In the wiper arm equipment provided with such wing, an insert plate are formed as integral parts of the wing, portions of the plates being planted in the wing, to fix the wing on the arm piece at two positions.

Generally, the wing is fixed on the arm piece in such a way that the wing is put on the arm piece in the production line of the manufacturing process of the wiper arm equipment, and screws are driven into the holes bored on the insert plate.

On the other hand, there are many cases where a user or a dealer optionally mounts an integral member of wing and insert plates (wing parts) onto the arm piece of the wiper arm equipment according to their liking.

However, conventionally, as wing parts in which a wing and insert plates are combined in one unit, ones for installation have to be prepared separately, thereby requiring separate molds for forming each wing parts.

Moreover, if the tapping screw is used to fix the arm piece to the insert plate which is connected to the wing as one unit, the tight state is easily loosened because screws easily become "dull" (ineffective).

SUMMARY OF THE INVENTION

The purpose of the present invention is to provide wiper arm equipment which makes it possible to commonly use the wing parts consisting of a wing and plates without manufacturing the parts separately for production line installation and for optional installation and which is capable of easily and securely fixing the wing on the arm piece.

To achieve the above purpose, a wiper arm equipment according to the present invention is constructed as follows. That is, in a wiper arm equipment which comprises a wiper shank, an arm piece connecting this wiper shank to a wiper blade, and a wing to be fixed on this arm piece; the wing is mounted on the arm piece, a pair of insert plates is implanted integrally into the wing, a pair of screw holes is bored on each insert plate with a predetermined distance, one screw hole is arranged on a position facing the arm piece when the wing is mounted on the arm piece, and the other screw hole is arranged on a position other than that facing the arm piece.

In the wiper arm equipment according to the present invention, in installation on the production line, the wing is fixed onto the arm piece by screws driven into the screw holes bored on the insert plate provided in the position facing the arm piece.

In optional installation, the arm piece is held between stays and the insert plates of the wing so that hole of the stay coincides to the screw hole on the insert plate provided in the position not facing the arm piece, and screw is driven through these holes of stay and plate to fix the wing to the arm piece.

BRIEF DESCRIPTION OF THE DRAWINGS

The above and other objects and features of the present invention will become apparent when referred to the following descriptions given in conjunction with the accompanying drawings, wherein like reference numerals denote like elements, and in which:

FIG. 2 is a cross-sectional view along the line A—A in FIG. 1, showing a state of an installation on the production line of the embodiment;

FIG. 3 is a cross-sectional view along the line B—B in FIG. 1, showing also the state of the production line installation;

FIG. 4 is a cross-sectional view along the line A—A in FIG. 1, showing a state of an optional installation of the embodiment; and FIG. 5 is a cross-sectional view showing also the state of the optional installation, along the line B—B in FIG. 1.

DETAILED DESCRIPTION OF THE PREFERRED EMBODIMENT

Figure 1:
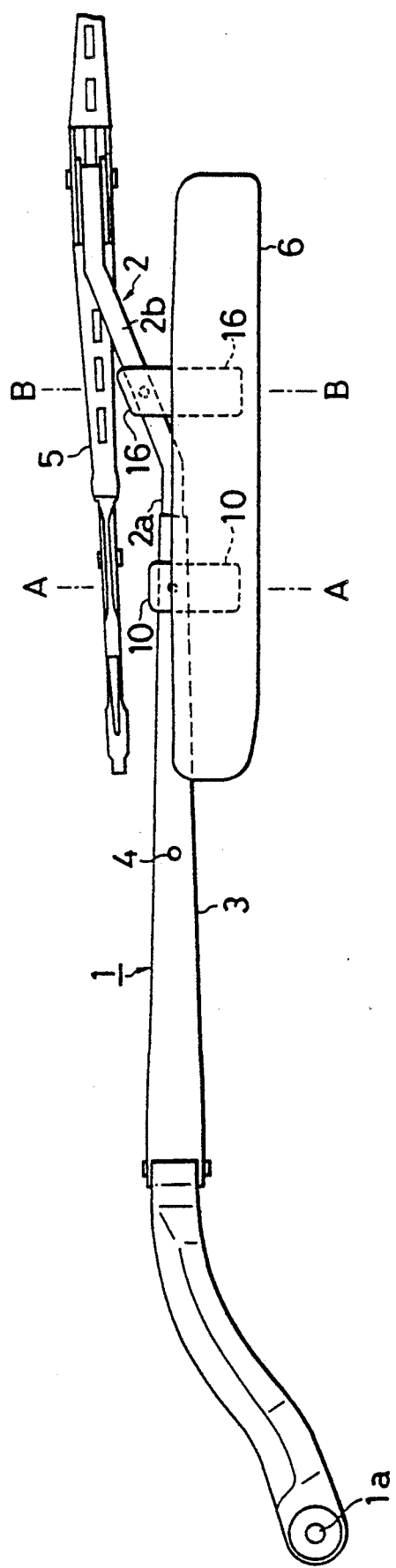
FIG. 1 is a top view showing wiper arm equipment as one embodiment of the present invention.

In the embodiment shown in the drawings, the wiper arm equipment according to the present invention is rotatably arranged on a fulcrum at the lower end section of the front wind shield (not shown here) of a vehicle, etc. This wiper arm equipment is provided with a wiper arm 1, and one end of the wiper arm 1 is fixed on an axis of rotation 1a which is arranged on the lower end section of the front wind shield. The wiper arm 1 is provided with an arm piece 2 and a wiper shank 3 into which arm piece 2 is inserted. The arm piece 2 is formed generally in a shape of a bent line, and fixed on the wiper shank 3 by means of a rivet 4 at a one end of it, and a wiper blade 5 is mounted on the other end of the arm piece 2.

As shown in FIG. 2 and 4, a straight section 2a of the arm piece consisting of a portion inserted into the wiper shank 3 and the portion extended from this inserted portion in a shape of straight line is formed generally in a shape of an elliptic pipe in cross-section. Moreover, a bent section 2b of the arm piece extending from the straight section 2a to the wiper blade 5 is formed in a shape of a square in cross-section as shown in FIGS. 3 and 5.

As shown in FIG. 1, the plane shape of the wing 6 is formed generally in a square out of synthetic resin as one unit, and the cross-section is formed in a shape of a curved wing. Moreover, a pair of supporting members 10, 16 is arranged on the wing 6 in the positions facing the straight section 2a and the bent section 2b of the arm piece 2, respectively. These supporting members 10, 16 are formed as one unit with the wing in the direction almost perpendicular to the longitudinal direction of the wing, with grooves 10a, 16a being sinkingly provided in the supporting members 10, 16 in parallel to the longitudinal direction of the wing 6, respectively.

As shown in FIG. 2, an insert plate 7 of base end side is provided on the supporting member 10 on the side of the straight section 2a of the arm piece with one part of it being integrally planted or embedded in the wing 6, and this insert plate 7 is bent and formed in a shape of crank in cross-section. Two screw holes 8, 9 are arranged and bored on the insert plate 7 in the position facing the straight section 2a of the arm piece 2 and in a position distant from that position respectively. On the other hand, a screw insert hole 11 is arranged and bored on the straight section 2a of the arm piece so as to face the screw hole 8. As described later, the wing 6 is fixed on the straight section 2a of the arm piece with the screw 12 inserted in the insert hole 11 and engaged with the screw hole 8 at the time of the installation on the production line.

Moreover, as shown in FIG. 3, an insert plate 15 of top end side is provided to the supporting member 16 on the side of the bent section 2b of the arm piece, with one part of it being embedded in the wing 6, and the insert plate 15 is bent and formed generally in a shape of "v" in cross section. Two screw holes 13, 14 are arranged and bored in the insert plate 15 at the position facing the bent section 2b of the arm piece and at the position distant from it, respectively. On the other hand, a screw insert hole 17 is arranged and bored on the bent section 2b of the arm piece so as to face the screw hole 13. As described later, the wing 6 is fixed on the bent section 2b of the arm piece by the screw 18 being inserted through the insert hole 17 to be engaged with the screw hole 13.

Thus, in this embodiment, a pair of the insert plates 7 and 15 with different shapes is integrally arranged on the wing 6 in the longitudinal direction of the wing 6 with a predetermined distance.

The operation of this embodiment is described as follows:

First, assembly of the wing onto the wiper arm in the case of the installation on the production line is described based on FIGS. 2 and 3.

Wing 6 is formed so that the insert plate 7 of base end side with screw holes 8, 9 and the insert plate 15 of top end side with screw holes 13, 14 are separately positioned with a predetermined distance with each other, and parts of these insert plates 7 and 15 are embedded in the wing 6 respectively.

On the other hand, an assembly body consisting of an arm piece 2, a wiper shank 3, and a wiper blade 5 is transferred to the production line of the wiper arm equipment. Being arranged so that the position of the screw hole 8 of the insert plate 7 coincides with the hole 11 in the straight section 2a of the arm piece 2 of the assembly body, the insert plate 7 and the arm piece 2 are fastened with a screw 12. Similarly, being arranged so that the position of the screw hole 13 on the insert plate 15 coincides with the hole 17 on the bent section 2b of the arm piece 2 of the assembly body which is transferred to the production line, the insert plate 15 and the arm piece 2 are fastened with a screw 18.

Next, assembly of the wing onto the wiper arm in the case of optional installation is described based on FIGS. 4 and 5:

Integral structure body (wing parts), which consists of the wing 6, the insert plate 7 with screw holes 8, 9, and the insert plate 15 with screw holes 13, 14, and has the same structure as described above, are kept by a user or dealer. A user or dealer installs the said wing parts on the wiper arm equipment, which is already mounted on a vehicle or has been kept separately from the vehicle, by means of stays 20, 21.

First, as shown in FIG. 4, the stay 20 is set to the insert plate 7 of base end side in the state where the screw hole 8 coincides with the screw insert hole 20a of the stay 20 and an end section of the stay 20 is engaged with the groove 10a formed sinkingly in the supporting member 10, and, then, the insert plate 7 and the stay 20 are both fastened with a screw 22.

Similarly, as shown in FIG. 5, the insert plate 15 and the stay 21 are fastened with a screw 23 in the state where the screw insert hole 21a of the stay 21 coincides with the screw hole 14 of the insert plate 15 of top end side, and an end section of the stay 21 is engaged with the groove 16a formed sinkingly in the supporting member 16.

In this optional installation, the insert plate 7 and insert plate 15 are almost covered with the stays 20, 21 respectively, to be of simple appearance, thereby satisfying a liking of a user.

As described above, it is possible to fasten the wing 6 to the arm piece 2a by means of the insert plate 7 with the same structure in the both cases of the installation on the production line and the optional installation. Moreover, it is also possible to fasten the wing 6 to the arm piece 2b by means of the insert plate 15 with the same structure in the both cases of the installation on the production line and the optional installation. Therefore, it is not necessary to separately manufacture the insert plates for the installation on the production line and for the optional installation so that it is only sufficient to form two insert plates 7, 15 integrally with the wing and to bore screw holes in two positions for each insert plate.

The present invention is described above in detail with respect to the embodiment shown in the drawings. However, the present invention is not limited to the above embodiment, and needless to say that various modifications can be achieved within the scope not departing from the gist of the present invention.

As described above, according to the present invention, it is possible to commonly use the wing parts consisting of the wing and insert plates in both cases of the installation on the production line and the optional installation. Therefore, it is sufficient to use only one mold in forming the insert plate and the wing as an integral structure, thereby simplifying the production of the wing parts for installation on the production line and the optional installation. Moreover, the wing and the insert plates are formed as an integral part, thereby improving the mechanical strength of the mounting section of the wing.

What is claimed is:

1. Wiper arm equipment, comprising:
   a wiper shank; a wiper blade; an arm piece connecting said wiper shank to said wiper blade; a wing to be mounted on and to be fixed to said arm piece; a pair of insert plates joined to said wing as respective integral parts of said wing; and a pair of screw holes bored in each insert plate a predetermined distance from each other, one of said screw holes being arranged to confrontingly align with said arm piece when said wing is mounted on the arm piece, and the other of said screw holes being arranged out of confronting alignment with the arm piece, when said wing is mounted on the arm piece.

2. Wiper arm equipment as set forth in claim 1; wherein,
said wing is formed of a molded resin and is provided with a pair of supporting members, which are formed of said molded resin as an integral part of said wing, said supporting members extending in a direction that intersects said wing perpendicularly, and respective portions of each of said insert plates are embedded in respective ones of said supporting members.

3. Wiper arm equipment as set forth in claim 2; wherein,
said arm piece, said wiper shank and said wiper blade constitute an assembly body, said assembly body having at least two screw insert holes that are respectively alignable with respective said screw holes of said insert plates, and a pair of screws insertable in said screw holes and said screw insert holes, when aligned, for fastening said assembly body to said supporting members for production line installation of said wing to said assembly body.

4. Wiper arm equipment as set forth in claim 2; wherein,
said arm piece, said wiper shank and said wiper blade constitute an assembly body, and wherein said wiper arm further includes a pair of stays formed to be joined to said wing, each said stay having a respective screw insert hole alignable with respective screw holes of said insert plates, and a pair of screws insertable in said screw holes and said screw insert holes, when aligned, for fastening said assembly body between said supporting members and said stays for optional installation of said wing to said assembly body.

5. Wiper arm equipment as set forth in claim 4; wherein,
each of said stays substantially covers each of said insert plates.

6. Wiper arm equipment as set forth in claim 5; wherein,
said arm piece comprises a straight section consisting of a portion which is inserted into said wiper shank and a portion straightly extending from said inserted portion, and a bent section extending from said straight section to said wiper blade.

7. Wiper arm equipment as set forth in claim 4; wherein,
each of said stays includes an end section and a groove is formed in each of said supporting members to accommodate a respective said end section of each of said stays.

8. Wiper arm equipment as set forth in claim 7; wherein,
said arm piece comprises a straight section consisting of a portion which is inserted into said wiper shank and a portion straightly extending from said inserted portion, and a bent section extending from said straight section to said wiper blade.

* * * * *